(12) United States Patent
Huang

(10) Patent No.: US 11,664,702 B1
(45) Date of Patent: May 30, 2023

(54) CANNED MOTOR DEVICE

(71) Applicant: ZI YI ELECTRICAL ENGINEERING CO., LTD., Taichung (TW)

(72) Inventor: Ting-Tsai Huang, Taichung (TW)

(73) Assignee: ZI YI ELECTRICAL ENGINEERING CO., LTD., Taichung (TW)

( * ) Notice: Subject to any disclaimer, the term of this patent is extended or adjusted under 35 U.S.C. 154(b) by 0 days.

(21) Appl. No.: 17/583,534

(22) Filed: Jan. 25, 2022

(51) Int. Cl.
*H02K 7/00* (2006.01)
*F04D 29/18* (2006.01)
*F04D 13/06* (2006.01)

(52) U.S. Cl.
CPC ......... *H02K 7/003* (2013.01); *F04D 13/0606* (2013.01); *F04D 29/18* (2013.01)

(58) Field of Classification Search
CPC ...... H02K 7/003; F04D 13/0606; F04D 29/18
USPC .......................................................... 310/420
See application file for complete search history.

(56) References Cited

U.S. PATENT DOCUMENTS

| | | | |
|---|---|---|---|
| 11,428,158 B2 * | 8/2022 | Daimer | F16D 1/06 |
| 11,603,845 B2 * | 3/2023 | Huang | F04D 13/02 |
| 2018/0026489 A1 * | 1/2018 | Hill | H02K 15/14 |
| | | | 310/420 |
| 2020/0386153 A1 * | 12/2020 | Daimer | F04D 29/20 |

* cited by examiner

*Primary Examiner* — Terrance L Kenerly
(74) *Attorney, Agent, or Firm* — Lando & Anastasi, LLP

(57) ABSTRACT

A canned motor device includes a motor unit that includes an inner rotor having a plurality of engaging grooves and a plurality of protrusions, and an impeller having a plurality of engaging hooks and a plurality of inner grooves. Each of the protrusions has at least one lateral protrusion surface. Each of the inner grooves is defined by a main groove surface, two lateral groove surfaces and a groove end surface. When the engaging hooks respectively engage the engaging groove, the protrusions respectively engage the inner grooves in a manner that the at least one lateral protrusion surface of each of the protrusions urges one of the lateral groove surfaces of the respective one of the inner grooves.

8 Claims, 8 Drawing Sheets

CANNED MOTOR DEVICE

FIELD

The disclosure relates to a canned motor device, and more particularly to a canned motor device that includes a rotor assembly with enhanced stability when in operation.

BACKGROUND

A conventional canned motor device disclosed in Taiwanese Patent No. 507049 includes a magnetic rotor 80, an impeller 81 and two pins 82. The impeller 81 has a rotor coupling section 811 that surrounds an imaginary axis, and that has an outer surrounding surface 812, a plurality of impeller protrusions 813 and a plurality of impeller grooves 814. The impeller protrusions 813 are angularly spaced apart from each other about the imaginary axis and. protrude from the outer surrounding surface 812. The impeller grooves 814 are angularly spaced apart from each other about the imaginary axis. Each of the impeller protrusions 813 has two impeller lateral surfaces 815 each of which is connected to the outer surrounding surface 812 and extends parallelly to the imaginary axis. Each of the impeller lateral surfaces 815 cooperates with the outer surrounding surface 812 and one of the impeller lateral surfaces 815 of one of the impeller protrusions 813 that is adjacent thereto to define a respective one of the impeller grooves 814 (i.e., each of the impeller grooves 814 is located between two adjacent ones of the impeller protrusions 813). The magnetic rotor 80 has an impeller coupling section 801 that is coupled to the rotor coupling section 811 of the impeller 81, that surrounds the imaginary axis, and that has an inner surrounding surface 802, a plurality of rotor protrusions 803 and a plurali of rotor grooves 804. Each of the rotor protrusions 803 has two rotor lateral surfaces 805 each of which is connected to the inner surrounding surface 802 and extends paralelly to the imaginary axis. Each of the rotor lateral surfaces 805 cooperates with the inner surrounding surface 802 and one of the rotor lateral surfaces 805 of one of the rotor protrusions 803 that is adjacent thereto to define a respective one of the rotor grooves 804 (i.e., each of the rotor grooves 804 is located between two adjacent ones of the rotor protrusions 803). When the impeller coupling section 801 of the magnetic rotor 80 and the rotor coupling section 811 of the impeller 81 are coupled, the rotor protrusions 803 of the magnetic rotor 80 respectively engage the impeller grooves 814 of the impeller 81 and the impeller protrusions 813 of the impeller 81 respective engage the rotor grooves 804 of the magnetic rotor 80 in a manner that each of the impeller lateral surfaces 815 abuts against a respective one of the rotor lateral surfaces 805 of a respective one of the rotor protrusions 803. Therefore, via the impeller lateral surfaces 815 of the impeller 81 abutting against the rotor lateral surfaces 805 of the magnetic rotor 80, rotational power can be transmitted between the impeller 81 and the magnetic rotor 80.

The magnetic rotor 80 is operable to drive the impeller 81 to co-rotate, via the rotor lateral surfaces 805 thereof and the impeller lateral surfaces 815 of the impeller 81, so that the conventional canned motor device may pump liquid. However, the rotor lateral surfaces 805 of the magnetic rotor 80 and the impeller lateral surfaces 815 of the impeller 81 may not prevent the magnetic rotor 80 and the impeller 81 from separating from each other in a direction of the imaginary axis when the conventional canned motor device is in operation. Therefore, to prevent the magnetic rotor 80 and the impeller 81 from separating when the conventional canned motor device is in operation, the rotor coupling section 811 of the impeller 81 is formed with two impeller holes 816, and the impeller coupling section 801 of the magnetic rotor 80 is formed with two rotor holes 806 that respectively correspond in position to the impeller holes 816. In addition, each of the pins 82 extends through a respective one of the impeller holes 816 and the respective one of the rotor holes 606 to interconnect the impeller 81 and the magnetic rotor 80. However, this configuration of the conventional canned motor device is relatively complex and makes the conventional canned motor device difficult to assemble.

SUMMARY

Therefore, an object of the disclosure is to provide a rotor assembly that can alleviate the drawback of the prior art.

According to the disclosure, the rotor assembly includes an inner rotor and an impeller. The inner rotor has a first section, a second section and a shoulder portion. The first section has a rotor end surface, an outer surface, a plurality of protrusions and a plurality of engaging grooves. The outer surface surrounds an axis and is connected to the rotor end surface. The protrusions are angularly spaced apart from each other about the axis and protrude from the outer surface. The engaging grooves are angularly spaced apart from each other about the axis and are indented from the outer surface. The second section is located at one side of the outer surface opposite to the rotor end surface and is connected to the first section in a direction of the axis. The shoulder portion interconnects the first section and the second section. Each of the protrusions extends from the rotor end surface to the shoulder portion, and has a first protrusion end and a second protrusion end that are respectively adjacent to the rotor end surface and the shoulder portion, and at least one lateral protrusion surface that extends from the first protrusion end to the second protrusion end, and that is oblique to the axis. The second protrusion end has a width in a circumferential direction of the inner rotor greater than that of the first protrusion end. The impeller has a connecting section and a vane section. The connecting section is coupled to the first section of the inner rotor, and has a shoulder facing surface, an inner surrounding surface, an outer surrounding surface, a plurality of inner grooves, a plurality of pairs of slots and a plurality of engaging hooks. The shoulder facing surface corresponds in position to the shoulder port on of the inner rotor. The inner surrounding surface surrounds the axis and defines an accommodating hole. The outer surrounding surface is opposite to the inner surrounding surface. Each of the inner grooves is indented from the inner surrounding surface, is formed through the shoulder facing surface and has a first groove end that is adjacent to the shoulder facing surface, and a second groove end that is opposite to the first groove end along the axis. The first groove end has a width in circumferential direction of the impeller greater than that of the second groove end. Each of the slots is indented from the shoulder facing surface and is formed through the inner surrounding surface and the outer surrounding surface. Each of the engaging hooks is located between a respective one pair of the slots. The vane section as connected to the connecting section in the direction of the axis. Each of the inner grooves is defined by a main groove surface, two lateral groove surfaces and a groove end surface. The main groove surface of each of the inner grooves is located radially between the inner surrounding surface and the outer surrounding surface. Each of the lateral groove surfaces of each of the inner grooves interconnects the main groove surface of the inner groove and the inner surrounding surface, and extends from the first groove end to the second groove end. The groove end surface of each of the inner grooves interconnects the main groove surface, the lateral groove surfaces and the inner surrounding surface and is located at the second groove end. At least one of the lateral groove surfaces is oblique to the axis. Each of the protrusions of the inner rotor has a largest width in the circumferential direction of the inner rotor greater than a smallest width of a respective one of the inner grooves of the impeller in the circumferential direction of the impeller so that when the engaging hooks of the impeller respectively engage the engaging grooves of the inner rotor, the protrusions of the inner rotor respectively engage the inner grooves of the impeller in a manner that the at least one lateral protrusion surface of each of the protrusions urges one of the lateral groove surfaces of the respective one of the inner grooves.

Another object of the disclosure is to provide a canned motor device that can alleviate the drawback of the prior art.

According to rue disclosure, the canned motor device includes a base, a fixed seat, a motor unit, a first cover and a second cover. The base is formed in a shape of a hollow cylinder that surrounds an axis, and defines an accommodating space. The fixed seat is formed in a shape of a hollow cylinder that surrounds the axis, and is disposed in the accommodating space. The motor unit includes a case body, a stator, an inner rotor and an impeller. The case body is disposed on the base. The stator is sleeved on the case body and is surrounded by the fixed seat. The inner rotor is disposed in the case body and has a first section, a second section and a shoulder portion. The first section has a rotor end surface, an outer surface, a plurality of protrusions and a plurality of engaging grooves. The outer surface surrounds an axis and is connected to the rotor end surface. The protrusions are angularly spaced apart from each other about the axis and protrude from the outer surface. The engaging grooves are angularly spaced apart from each other about the axis and are indented from the outer surface. The second section is located at one side of the outer surface opposite to the rotor end surface and is connected to the first section in a direction of the axis. The shoulder portion interconnects the first section and the second section. Each of the protrusions extends from the rotor end surface to the shoulder portion, and has a first protrusion end and a second protrusion end that are respectively adjacent to the rotor end surface and the shoulder portion, and at least one lateral protrusion surface that extends from the first protrusion end to the second protrusion end, and that is oblique to the axis. The second protrusion end has a width in a circumferential direction of the inner rotor greater than that of the first protrusion end. The impeller has a connecting section and a vane section. The connecting section is coupled to the first section of the inner rotor, and has a shoulder facing surface, an inner surrounding surface, an outer surrounding surface, a plurality of inner grooves, a plurality of pairs of slots and a plurality of engaging hooks. The shoulder facing surface corresponds in position to the shoulder portion of the inner rotor. The inner surrounding surface surrounds the axis and defines an accommodating hole. The outer surrounding surface is opposite to the inner surrounding surface. Each of the inner grooves is indented from the inner surrounding surface, is formed through the shoulder facing surface and has a first groove end that is adjacent to the shoulder facing surface, and a second groove end that is opposite to the first groove end along the axis. The first groove end has a width in a circumferential direction of the impeller greater than that of the second groove end. Each of the slots is indented from the shoulder facing surface and is formed through the inner surrounding surface and the outer surrounding surface. Each of the engaging hooks is located between a respective one pair of the slots. The vane section is connected to the connecting section in the direction of the axis. Each of the inner grooves is defined by a main groove surface, two lateral groove surfaces and a groove end surface. The main groove surface of each of the inner grooves is located radially between the inner surrounding surface and the outer surrounding surface. Each of the lateral groove surfaces of each of the inner grooves interconnects the main groove surface of the inner groove and the inner surrounding surface, and extends from the first groove end to the second groove end. The groove end surface of each of the inner grooves interconnects the main groove surface, the lateral groove surfaces and the inner surrounding surface and is located at the second groove end. At least one of the lateral groove surfaces is oblique to the axis. The first cover is disposed on the base and covers the impeller. The second cover is located at one side of the base opposite to the first cover along the axis, and is fixedly mounted to the base. Each of the protrusions of the inner rotor has a largest width in the circumferential direction of the inner rotor greater than a smallest width of a respective one of the inner grooves of the impeller in the circumferential direction of the impeller so that when the engaging hooks of the impeller respectively engage the engaging grooves of the inner rotor, the protrusions of the inner rotor respectively engage the inner grooves of the impeller in a manner that the at least one lateral protrusion surface of each of the protrusions urges one of the lateral groove surfaces of the respective one of the inner grooves.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
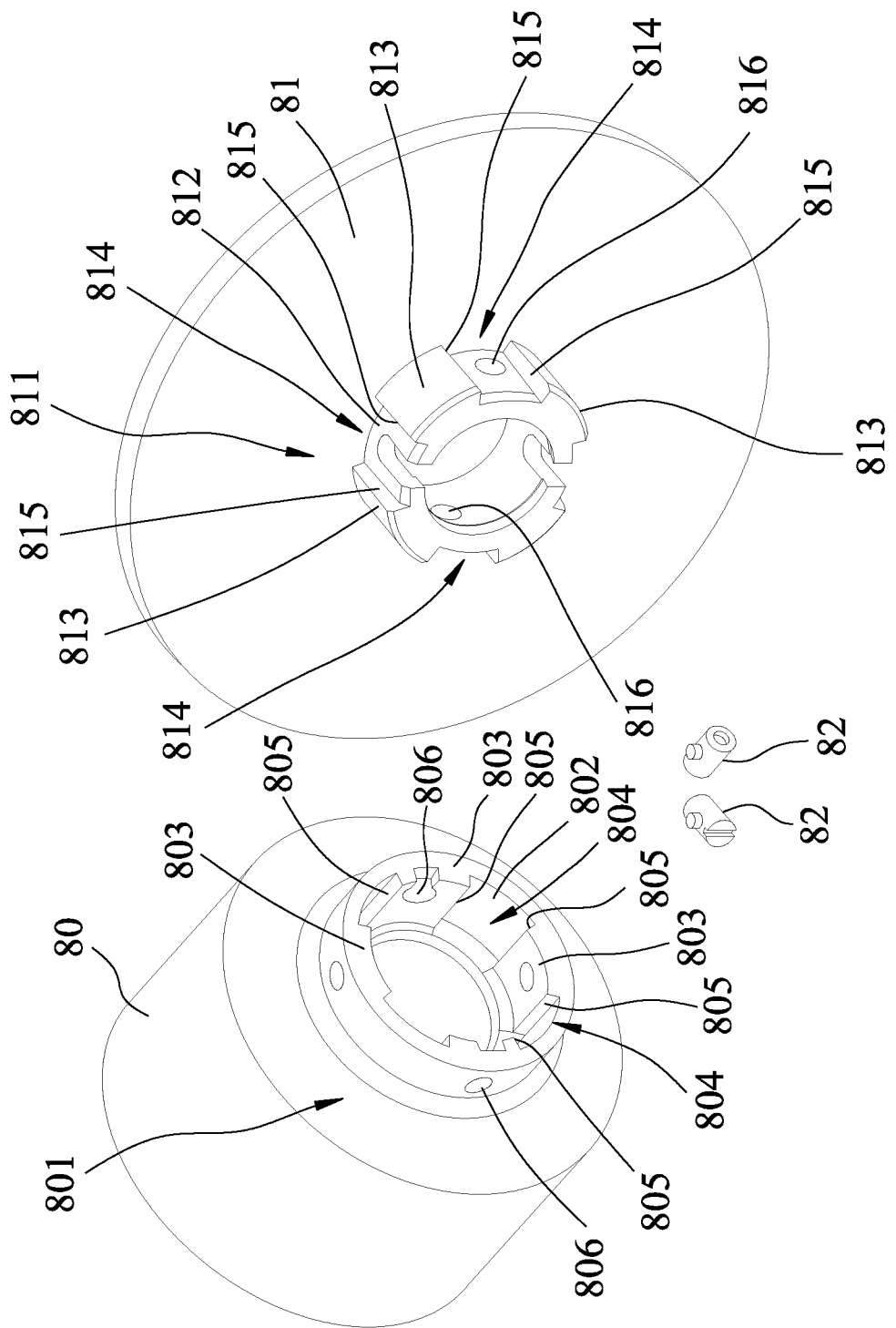
FIG. 1 is a perspective view of a conventional canned motor device.
Figure 2:
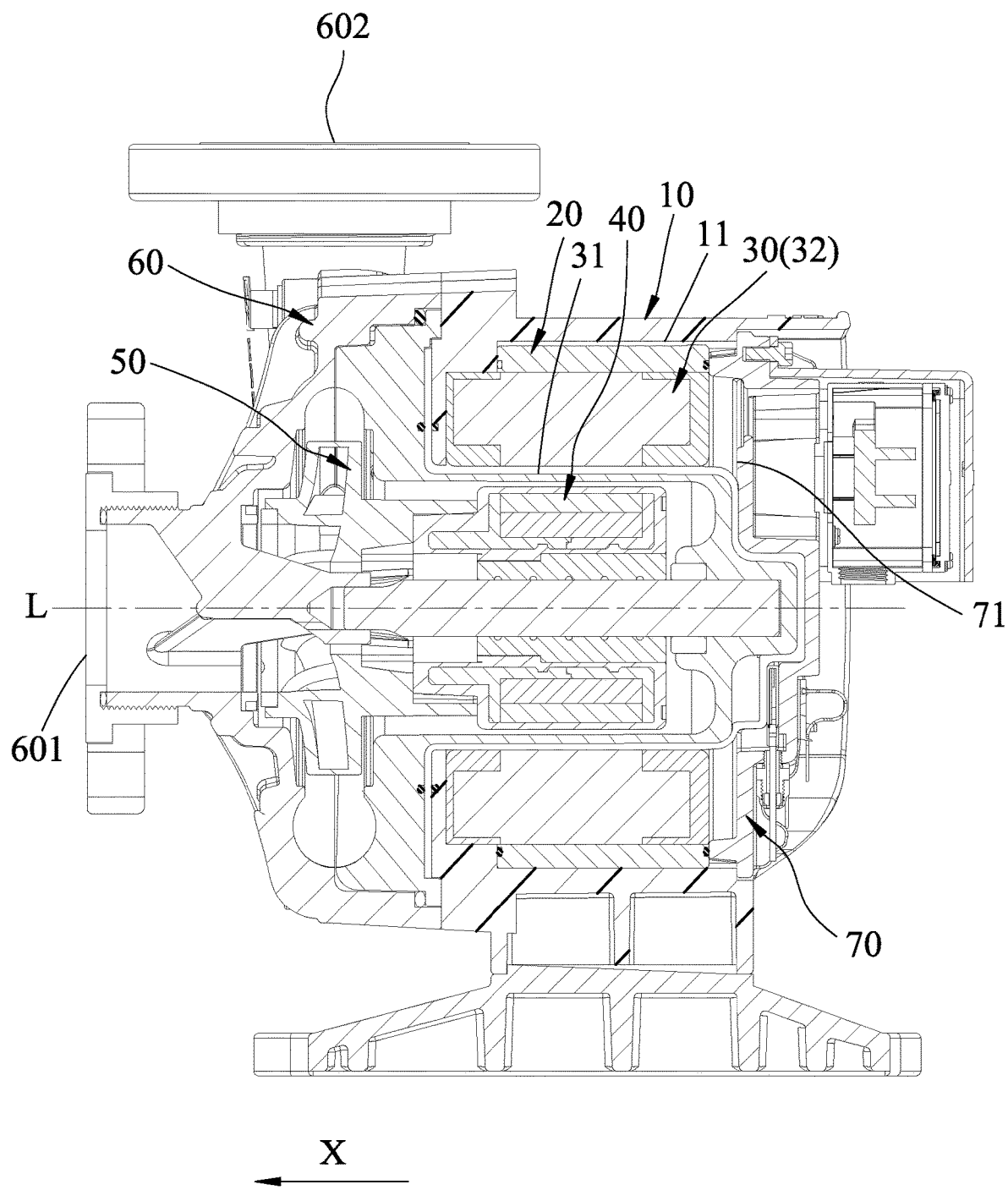
FIG. 2 is a sectional view of an embodiment of a canned motor device according to the disclosure.
Figure 3:
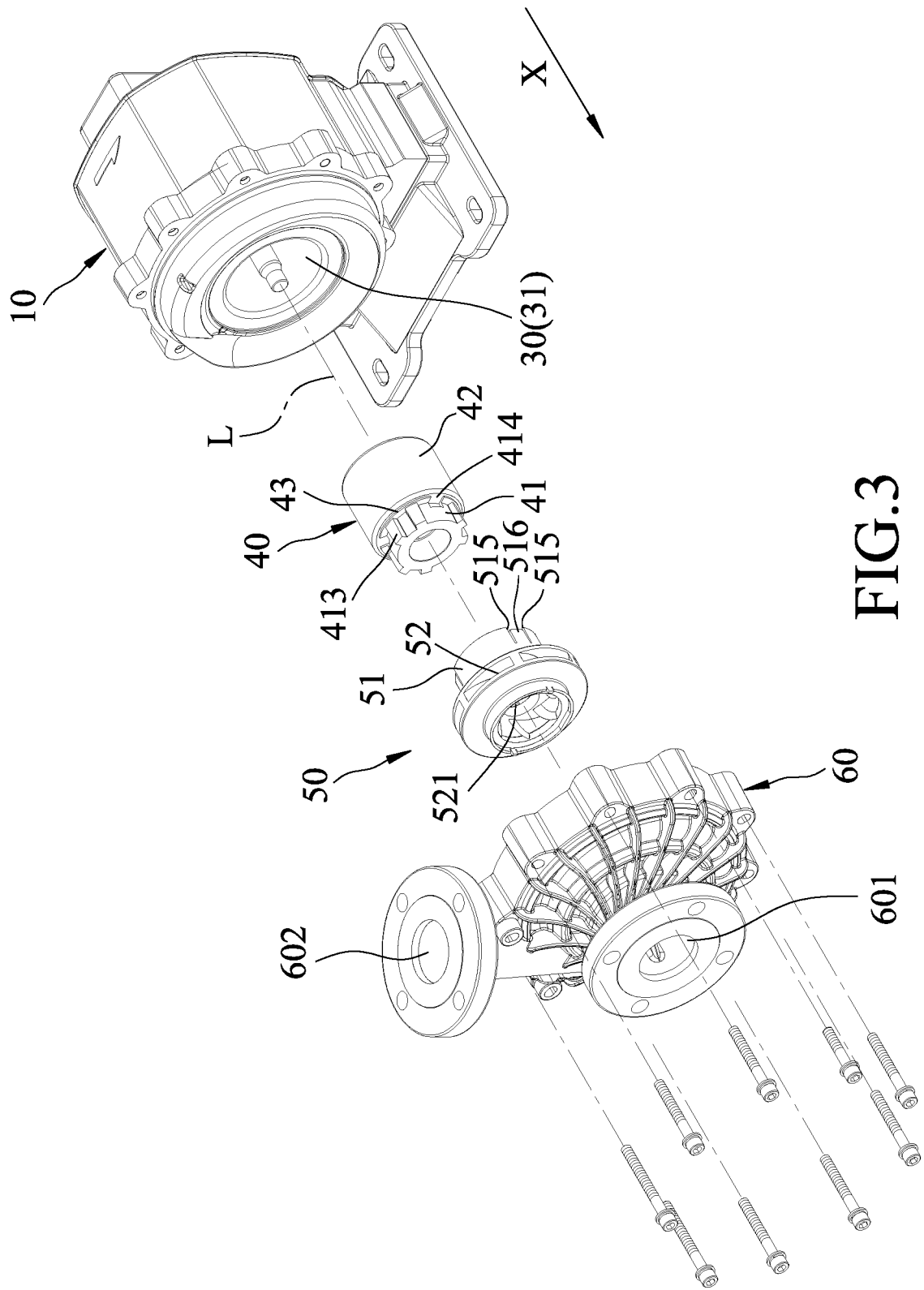
FIG. 3 is a partly exploded perspective view of the embodiment.
Figure 4:
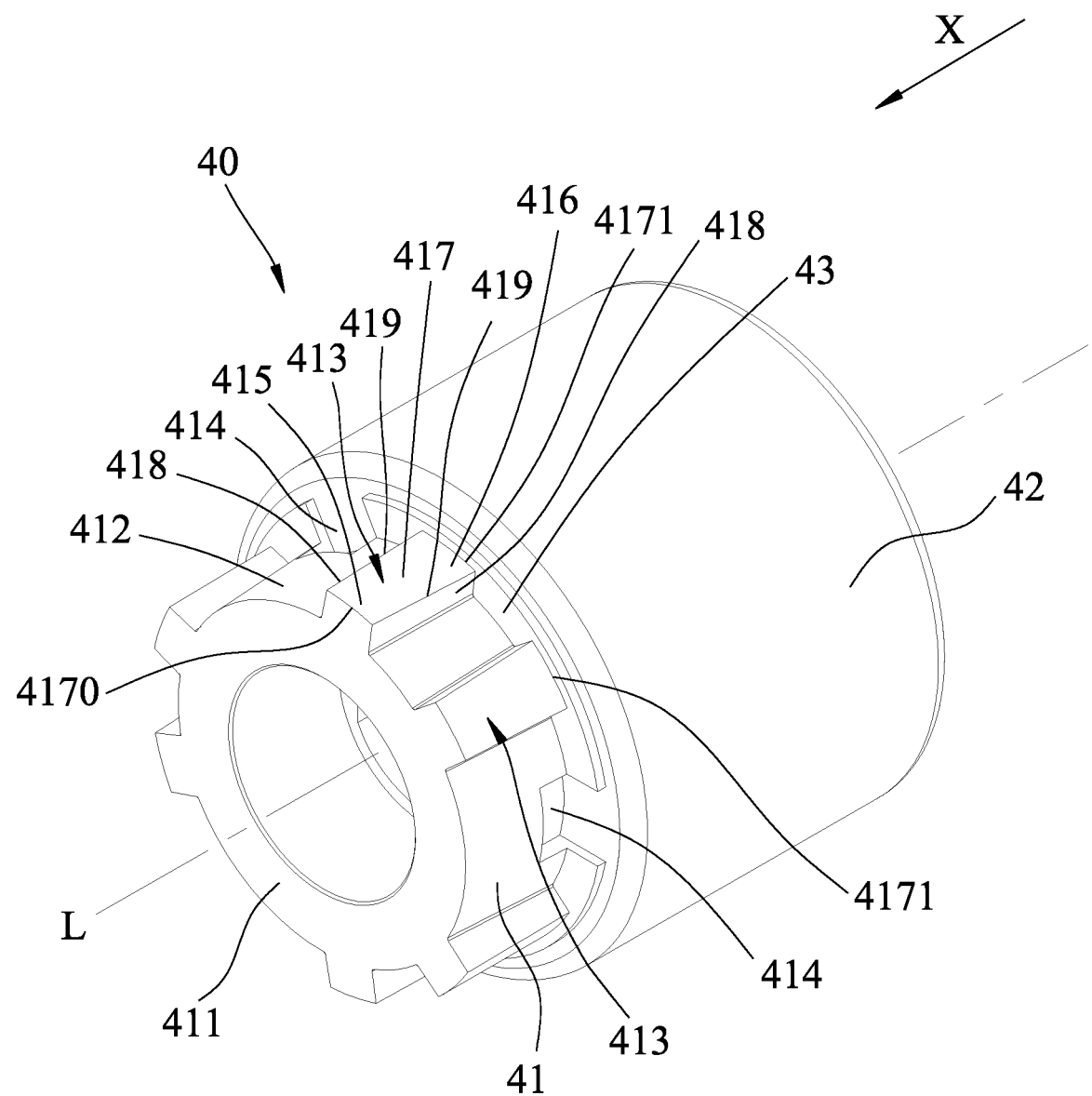
FIG. 4 is a perspective view of an inner rotor of the embodiment.

Referring to FIGS. 2 and 3, an embodiment of a canned motor device according to the disclosure includes a base 10, a fixed seat 20, a motor unit 30, a first cover 60 and a second cover 70.

The base 10 is made of a plastic material and is formed in a shape of a hollow cylinder that surrounds an axis (L). In this embodiment, the plastic material may be an engineering plastic with acid and alkali resistance, such as polypropylene (PP), glass fiber reinforced polypropylene (GFRPP), polyvinylidene difluoride (PVDF) and carbon fiber filled ethylene tetrafluoroethylene (CFRETFE). The base 10 defines an accommodating space 11 through which the axis (L) extends.

The fixed seat 20 is made of an. aluminum. alloy, is formed in a shape of a hollow cylinder that surrounds the axis (L), and is non-rotatably disposed in the accommodating space 11 of the base 10.

The motor unit 30 includes a case body 31, a stator 32, an inner rotor 40 and an impeller 50. The case body 31 is disposed on the base 10. The stator 32 is sleeved on the case body 31 and is surrounded by the fixed seat 20. The inner rotor 40 is disposed in the case body 31. The impeller 50 is connected to the inner rotor 40 in a manner that the impeller 50 and the inner rotor 40 are assembled to form a rotor assembly. Since the relevant features of this disclosure do not concern the specific operation of the motor unit 30, further details of the same are omitted herein for the sake of brevity, and only the configuration of the rotor assembly that includes the inner rotor 40 and the impeller 50 is described in the following description.

Referring further to FIGS. 4 and 6 to 8, the inner rotor 40 includes a first section 41, a second section 42 and a shoulder portion 43. The first section 41 has a rotor end surface 411, an outer surface 412, a plurality of protrusions 413 and a plurality of engaging grooves 414. The outer surface 412 surrounds the axis (L), and is connected to the rotor end surface 411. The protrusions 413 are angularly spaced apart from each other about the axis (L) and protrude from the outer surface 412. The engaging grooves 414 are angularly spaced apart from each other about the axis (L) and are indented from the outer surface 412. The second section 42 is located at one side of the outer surface 412 opposite to the rotor end surface 411 and is connected to the first section 41 in a direction (X) of the axis (L). The shoulder portion 43 interconnects the first section 41 and the second section 42. Specifically, the outer surface 412 is configured to be frustoconical and tapers toward the rotor end surface 411. Each of the protrusions 413 extends from the rotor end surface 411 to the shoulder portion 43, and has a first protrusion end 415, a second protrusion end 416, a main protrusion surface 417 and two lateral protrusion surfaces 416. The first protrusion end 415 and the second protrusion end 416 are respectively adjacent to the rotor end surface 411 and the shoulder portion 43. In this embodiment, the second protrusion end 416 has a width in a circumferential direction of the inner rotor 40 greater than that of the first protrusion end 415. The main protrusion surface 417 is spaced apart from the outer surface 412. Each of the lateral protrusion surfaces 418 extends from the first protrusion end 415 to the second protrusion end 416, and is oblique to the axis (L). Specifically, in this embodiment, the angle between the axis (L) and the normal vector of each of the lateral protrusion surfaces 418 ranges from 87 to 88 degrees. The main protrusion surface 417 is substantially configured to be in the shape of a trapezoid, and has two lateral protrusion edges 419, a first protrusion edge 4170 and a second protrusion edge 4171. The lateral protrusion edges 419 are angularly spaced apart from each other about the axis (L). The first protrusion edge 4170 interconnects the lateral protrusion edges 419 and is adjacent to the rotor end surface 411 of the first section 41. The second protrusion edge 4171 is spaced apart from the first protrusion edge 4170 along the axis (L), interconnects the lateral protrusion edges 419, and is adjacent to the shoulder portion 43. For each protrusion 413, each of the lateral protrusion surfaces 418 interconnects the outer surface 412 of the first section 41 and a respective one of the lateral protrusion edges 419 of the main protrusion surface 417. For each protrusion 413, the shape of the trapezoid in which the main protrusion surface 417 is configured to be is defined by the lateral protrusion edges 419, the first protrusion edge 4170 and the second protrusion edge 4171.

Figure 5:
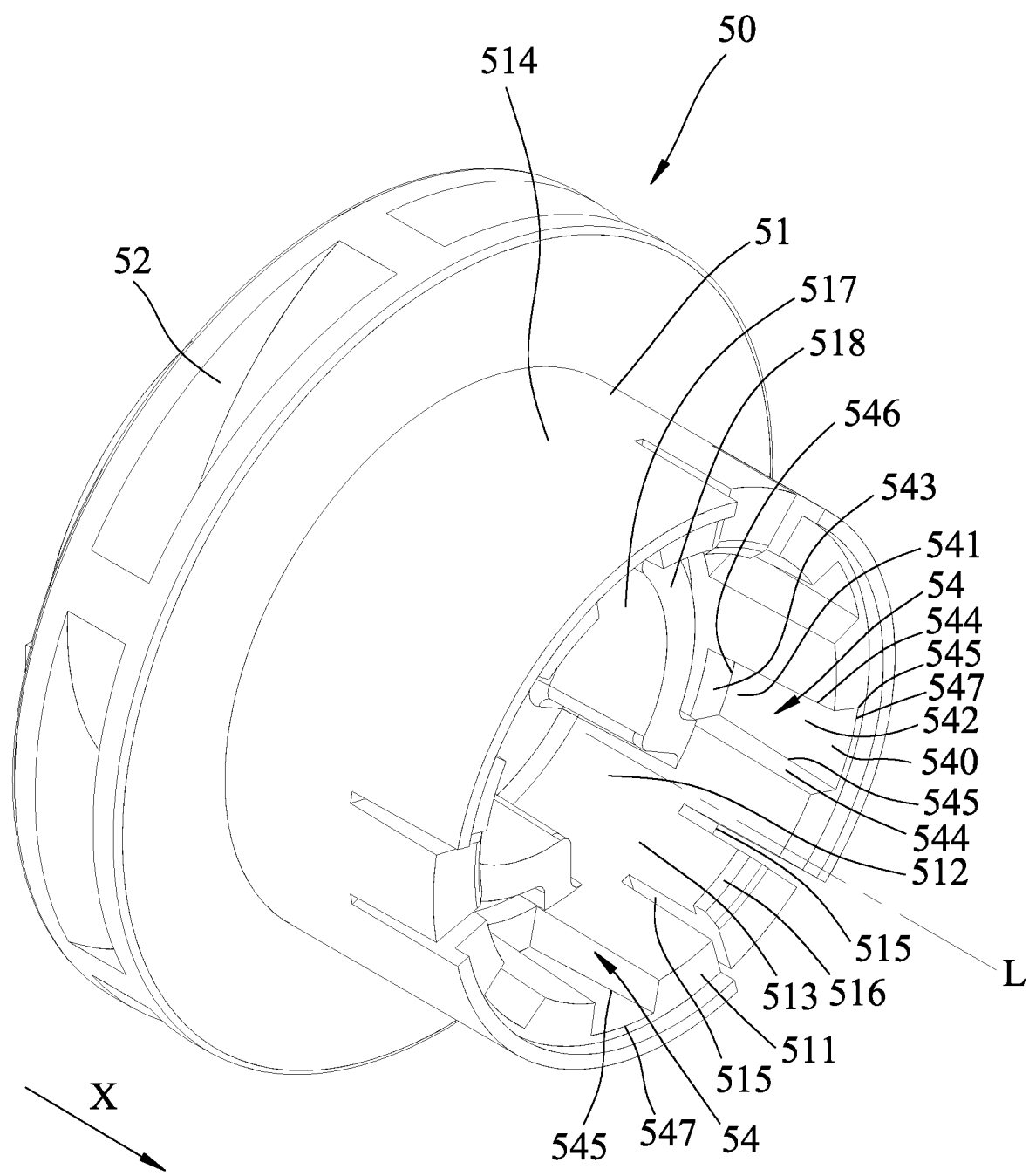
FIG. 5 is a perspective view of an impeller of the embodiment.
Figure 6:
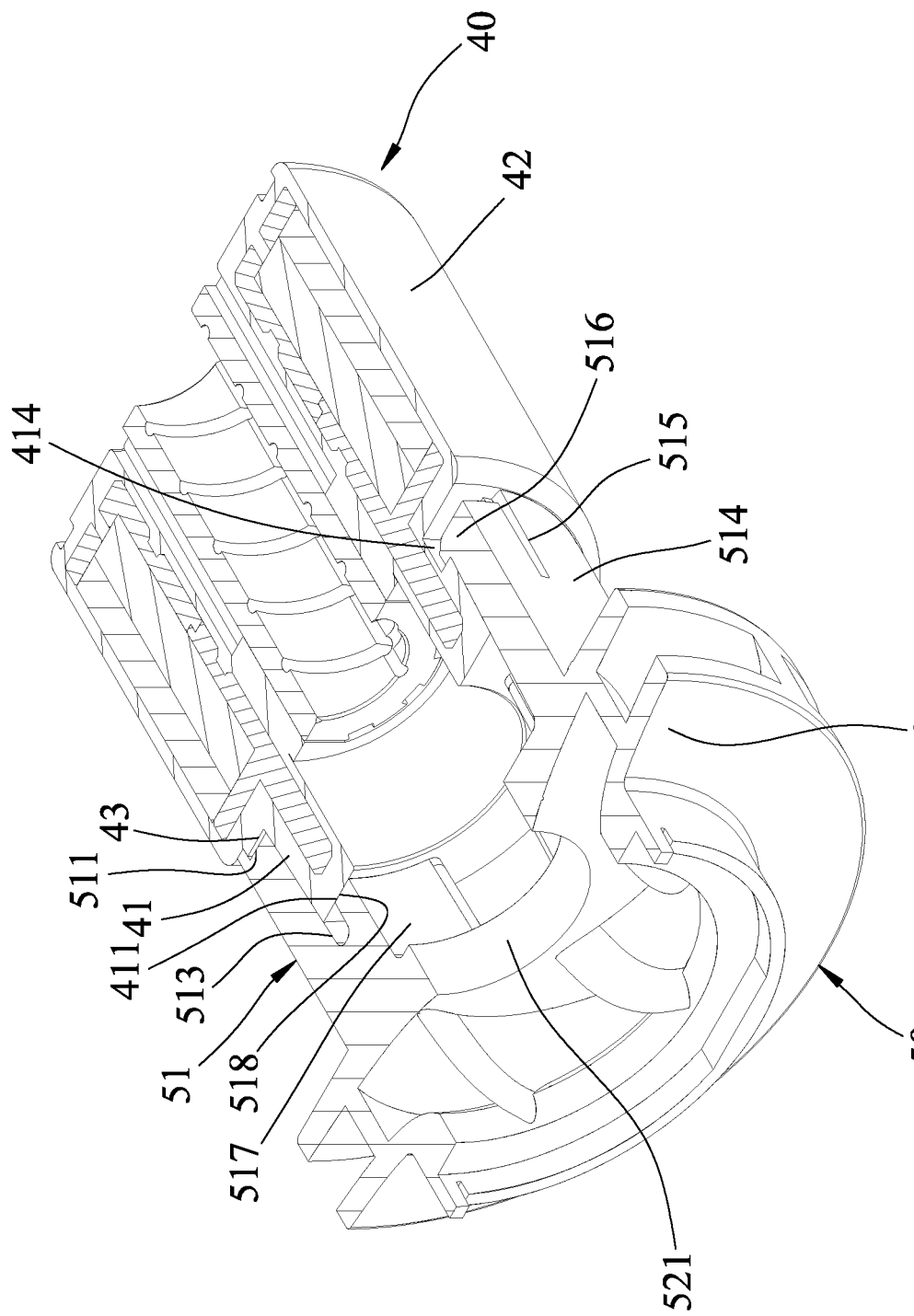
FIG. 6 is a cutaway view of a rotor assembly that includes the inner rotor and the impeller.
Figure 7:
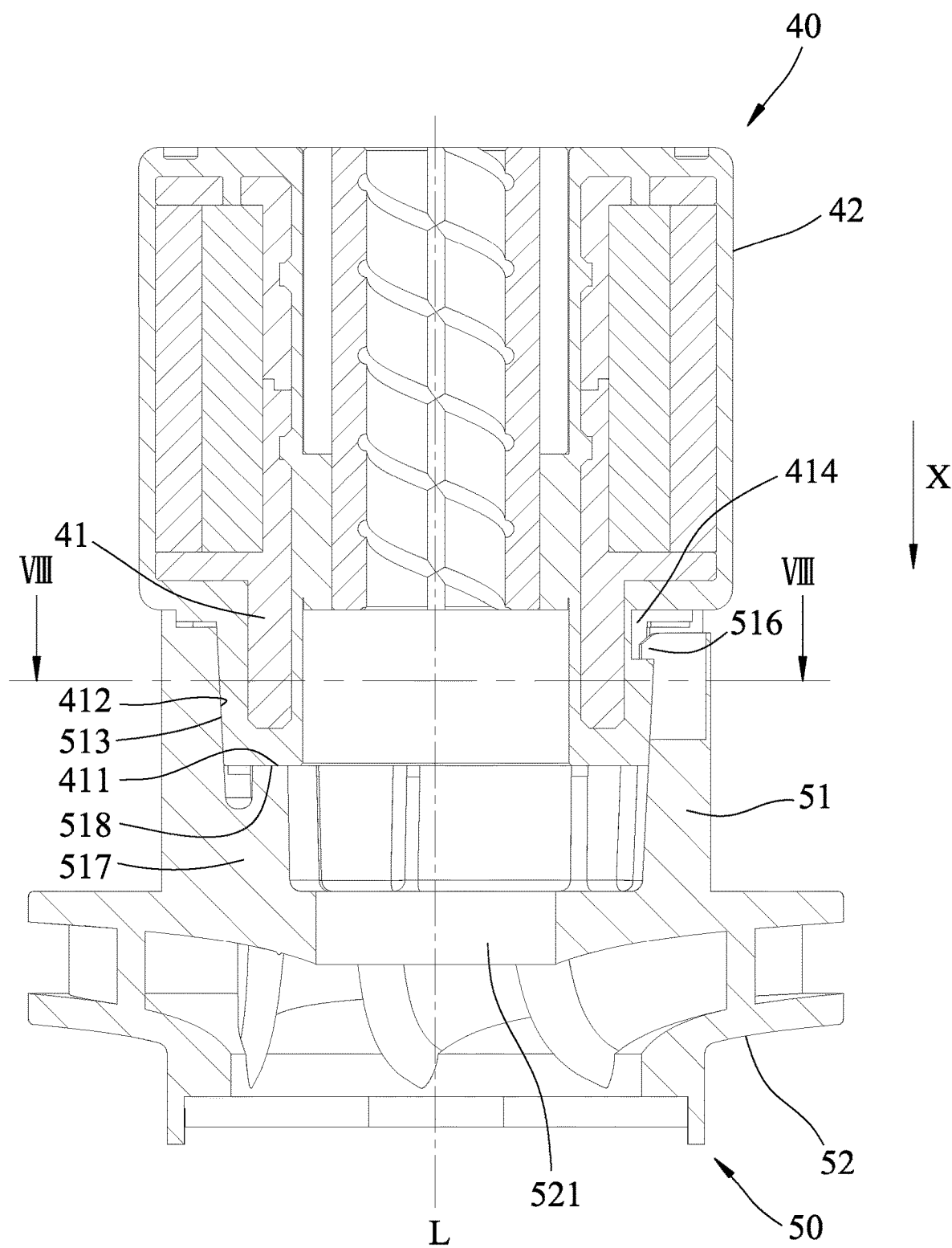
FIG. 7 is a sectional view of the rotor assembly.
Figure 8:
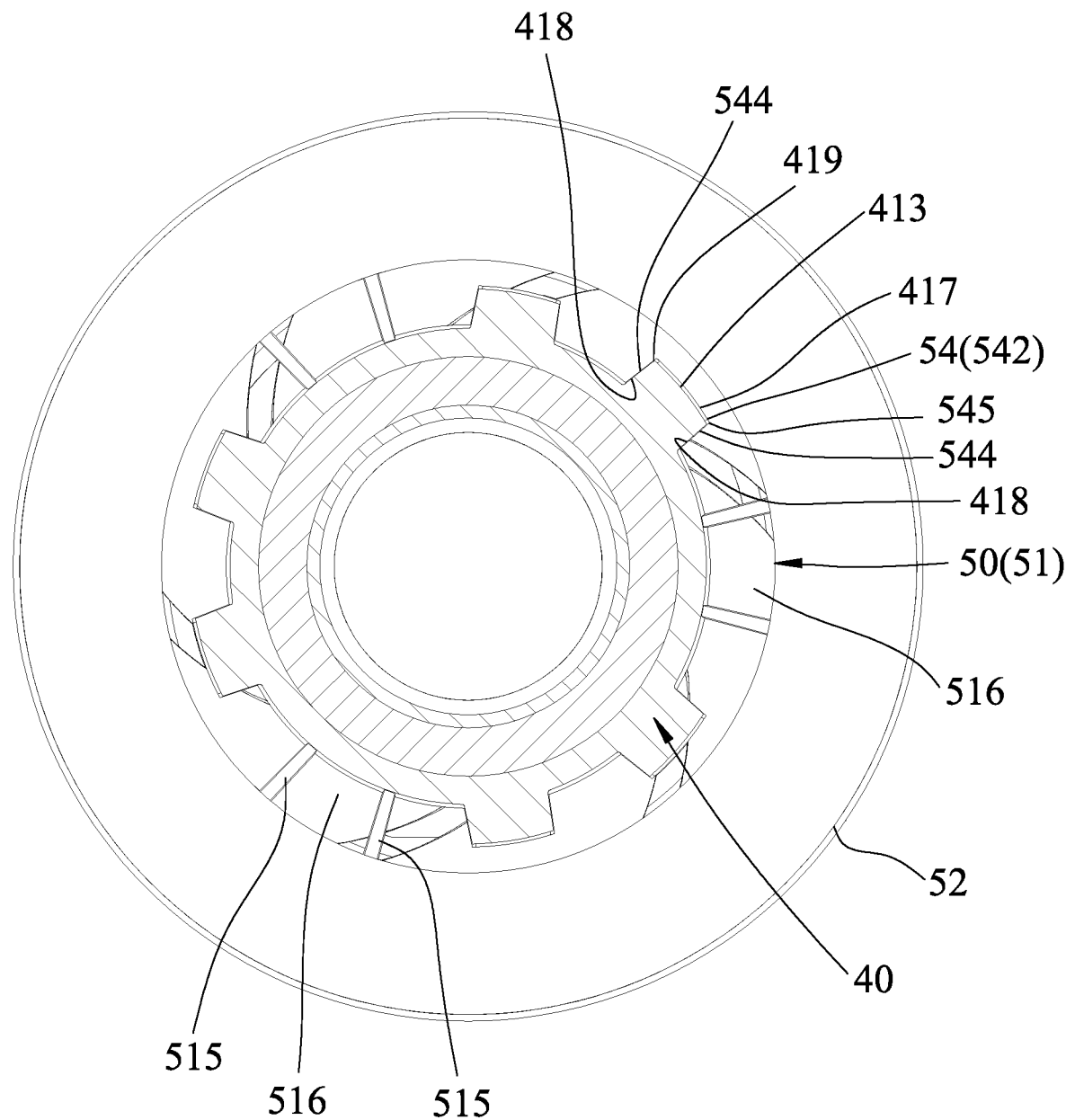
FIG. 8 is a sectional view taken along line VIII-VIII in FIG. 7.

Referring further to FIG. 5, the impeller 50 has a connecting section 51 and a vane section 52 that is connected to the connecting section 51 in the direction (X) of the axis (L). The connecting section 51 is coupled to the first section 41 of the inner rotor 40, and has a shoulder facing surface 511, an inner surrounding surface 513, an outer surrounding surface 514, a plurality of inner grooves 54, an abutting portion 517, a plurality of pairs of slots 515, and a plurality of engaging hooks 516. The shoulder facing surface 511 corresponds in position to the shoulder portion 43 of the inner rotor 40. The inner surrounding surface 513 is connected to the shoulder facing surface 511, surrounds the axis (L) and defines an accommodating hole 512. The outer surrounding surface 514 is opposite to the inner surrounding surface 513. Each of the inner grooves 54 is indented from the inner surrounding surface 513, is formed through the shoulder facing surface 511, and has a first groove end 540 and a second groove end 541. For each inner groove 54, the first groove end 540 is adjacent to the shoulder facing surface 511, and the second groove end 541 is opposite to the first groove end 540 along the axis (L). In this embodiment, the inner surrounding surface 513 is configured to be frustoconical and tapers from the shoulder facing surface 511 toward the vane section 52, and the first groove end 540 has a width in a circumferential direction of the impeller 50 greater than that of the second groove end 541. The abutting portion 517 is located between the vane section 52 and the inner grooves 54, protrudes from the inner surrounding surface 513, and has an abutting surface 518 that is adjacent to the second groove ends 541 of the inner grooves 54. Each of the slots 515 is indented from the shoulder facing surface 511 and is formed through the inner surrounding surface 513 and the outer surrounding surface 514. Each of the engaging hooks 516 is located between a respective one pair of the slots 515. Each of the inner grooves 54 is defined by a main groove surface 542, two lateral groove surfaces 544 and a groove end surface 543. The main groove surface 542 of each of the inner grooves 54 is located radially between the inner surrounding surface 513 and the outer surrounding surface 514. Each of the lateral groove surfaces 544 of each of the inner grooves 54 interconnects the main groove surface 542 of the inner groove 54 and the inner surrounding surface 513, and extends from the first groove end 540 to the second groove end 541. The groove end surface 543 of each of the inner grooves 54 interconnects the main groove surface 542, the lateral groove surfaces 544 and the inner surrounding surface 513, and is located at the second groove end 541. In this embodiment, each of the lateral groove surfaces 544 is oblique to the axis (L). Specifically, the angle between the axis (L) and the normal vector of each of the lateral groove surfaces 544 ranges from 87 to 88 degrees. The main groove surface 542 of each of the inner grooves 54 is substantially configured to be in the shape of a trapezoid, and has two lateral groove edges 545, a first groove edge 546 and a second groove edge 547. The lateral groove edges 545 are angularly spaced apart from each other about the axis (L). For each inner groove 54, the first groove edge 546 interconnects the lateral groove edges 545 and is adjacent to the second groove end 541. For each inner groove 54, the second groove edge 547 is spaced apart from. the first groove edge 546 alone the axis (L), interconnects the lateral groove edges 545, and is adjacent to the first groove end 540. For each inner groove 54, the shape of the trapezoid in which the main groove surface 542 is configured to be is defined by the lateral groove edges 545, the first groove edge 546 and the second groove edge 547.

To assemble the rotor assembly, the inner rotor 40 and the impeller 50 are coupled along the axis (L) in a manner that the inner rotor 40 and the impeller 50 are moved toward each other along the axis (L) to respectively engage the engaging hooks 516 of the impeller 50 with the engaging grooves 414 of the inner rotor 40. Each of the protrusions 413 of the inner rotor 40 has a largest width in the circumferential direction of the inner rotor 40 greater than a smallest width of a respective one of the inner grooves 54 of the impeller 50 in the circumferential direction of the impeller 50 so that when the engaging hooks 516 of the impeller 50 respectively engage the engaging grooves 414 of the inner rotor 40, the protrusions 413 of the inner rotor 40 respectively engage the inner grooves 54 of the impeller 50 in a manner that each of the lateral protrusion surfaces 418 of each of the protrusions 413 urges a respective one of the lateral groove surfaces 544 of the respective one of the inner grooves 54.

The first cover 60 is disposed on the base 10 in the direction (X) of the axis (L), and covers the impeller 50. Specifically, the first cover 60 is fixedly mounted to the base 10 by a plurality of screws, and has an intake opening 601 at an end thereof along the axis (L), and an exit opening 602 located at one side of the intake opening 601 that is the same as the impeller 50 and extending along a tangent line (not shown) to the outer periphery of the impeller 50.

The second cover 70 is located at one side of the base 10 opposite to the first cover 60 along the axis (L), is fixedly mounted to the base 10 by a plurality of screws, and has an inner cover surface 71 (see FIG. 2) that abuts against one end of the case body 31 of the motor unit 30.

In the following description, the advantages provided by the structures of the embodiment of the canned motor device of the disclosure are described.

When the stator 32 of the motor unit 30 is energized, the inner rotor 40 of the motor unit 30 is driven by the stator 32 to rotate and to further drive the impeller 50 of the motor unit 30 to co-rotate so that the embodiment may pump liquid in a manner that the liquid is moved into the canned motor device through the intake opening 601 and is moved toward the exit opening 602 by the impeller 50 to exit the canned motor device through the exit opening 602.

By virtue of the impeller 50 having the slots 515, the connecting section 51 of the impeller resiliently deformable. During the assembly of the inner rotor 40 and the impeller 50 along the axis (L), external forces are applied on the inner rotor 40 and the impeller 50 such that the inner rotor 40 and the impeller 50 are pushed against each other, and that the connecting section 51 is deformed radially outwardly about the axis (L). When the external forces are removed after the engaging hooks 516 of the impeller 50 reach the engaging grooves 414 of the inner rotor 40, the connecting section 51 restores to its original shape and pushes the inner rotor 40 away from the the impeller 50, so that the inner rotor 40 and the impeller 50 move away from each other and that each of the engaging hooks 516 tightly engages the respective one of the engaging grooves 414 of the inner rotor 40. Even though the impeller 50 and the rotor 40 may tend to move away from each other in the direction (X) of the axis (L) due to the rotational movement, when the canned motor device is in operation, the engaging hooks 516 restrain the impeller 50 from being separated from the inner rotor 40 in the direction (X) of the axis (L).

By virtue of the outer surface 412 of the inner rotor 40 and the inner surrounding surface 513 of the impeller 50 being configured to be frustoconical and tapering in the same direction, the outer surface 412 urges the inner surrounding surface 513 when the rotor assembly is assembled, and it may be easier to align the connecting section 51 of the impeller 50 with the first section 41 of the inner rotor 40. By virtue of each of the lateral protrusion surfaces 418 of each of the protrusions 413 of the inner rotor 40 and each of the lateral groove surfanes 544 of each of the inner grooves 54 of the impeller 50 being oblique to the axis (L), and by virtue of the lateral protrusion surfaces 418 of the inner rotor 40 respectively urging the lateral groove surfaces 544 of the impeller 50, gaps between the inner rotor 40 and the impeller 50 are minimized when the inner rotor 40 and the impeller 50 are coupled. Therefore, the stability of the impeller 50 is enhanced when in operation.

Overall, the canned motor device of the disclosure offers a design that is easy to assemble while providing the rotor assembly that includes the inner rotor 40 and the impeller 50 with enhanced stability.

In the description above, for the purposes of explanation, numerous specfic details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may he included in the practice of the disclosure. It should be further appreciated that in the description, various features are sometimes grouped together in a single embodiment, figure, or description thereof for the purpose of streamlining the disclosure and aiding in the understandnig of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A rotor assembly comprising:
  an inner rotor having
    a first section that has
      a rotor end surface,
      an outer surface surrounding an axis and connected to said rotor end surface,
      a plurality of protrusions angularly spaced apart from each other about the axis and protruding from said outer surface, and
      a plurality of engaging grooves angularly spaced apart from each other about the axis and indented from said outer surface,
    a second section that is located at one side of said outer surface opposite to said rotor end surface and that is connected to said first section in a direction of the axis, and
    a shoulder portion that interconnects said first section and said second section, each of said protrusions extending from said rotor end surface to said shoulder portion, and having a first protrusion end and a second protrusion end that are respectively adjacent to said rotor end surface and said shoulder portion, and at least one lateral protrusion surface that extends from said first protrusion end to said second protrusion end, and that is oblique to the axis, said second protrusion end having a width in a circumferential direction of said inner rotor greater than that of said first protrusion end; and an impeller having
- a connecting section that is coupled to said first section of said inner rotor and that has
  - a shoulder facing surface corresponding in position to said shoulder portion of said inner rotor,
  - an inner surrounding surface surrounding the axis and defining an accommodating hole,
  - an outer surrounding surface opposite to said inner surrounding surface,
  - a plurality of inner grooves each of which is indented from said inner surrounding surface, is formed through said shoulder facing surface and has
    - a first groove end that is adjacent to said shoulder facing surface, and
    - a second groove end that is opposite to said first groove end along the axis, said first groove end having a width in a circumferential direction of said impeller greater than that of said second groove end,
  - a plurality of pairs or slots each of which is indented from said shoulder facing surface and is formed through said inner surrounding surface and said outer surrounding surface, and
  - a plurality of engaging hooks each of which is located between a respective one pair of said slots, and
- a vane section that is connected to said connecting section in the direction of the axis, each of said inner grooves being defined by a main groove surface, two lateral groove surfaces and a groove end surface, said main groove surface of each of said inner grooves being located radially between said inner surrounding surface and said outer surrounding surface, each of said lateral groove surfaces of each of said inner grooves interconnecting said main groove surface of said inner groove and said inner surrounding surface, and extending from said first groove end to said second groove end, said groove end surface of each of said inner grooves interconnecting said main groove surface, said lateral groove surfaces and said inner surrounding surface and being located at said second groove end, at least one of said lateral groove surfaces being oblique to the axis, wherein, each of said protrusions of said inner rotor has a largest width in the circumferential direction of said inner rotor greater than a smallest width of a respective one of said inner grooves of said impeller in the circumferential direction of said impeller so that when said engaging hooks of said impeller respectively engage said engaging grooves of said inner rotor, said protrusions of said inner rotor respectively engage said inner grooves of said impeller in a manner that said at least one lateral protrusion surface of each of said protrusions urges one of said lateral groove surfaces of the respective one of said inner grooves.

2. The rotor assembly as claimed in claim 1, wherein:
said at least one lateral protrusion surface of each of said protrusions of said inner rotor includes two lateral protrusion surfaces;
each of said protrusions of said inner rotor further has
  a main protrusion surface that is spaced apart from said outer surface, that is substantially configured to be in the shape of a trapezoid, and that has
    two lateral protrusion edges angularly spaced apart from each other about the axis,
    a first protrusion edge interconnecting said lateral protrusion edges and adjacent to said rotor end surface of said first section, and
    a second protrusion edge spaced apart from said first protrusion edge along the axis, interconnecting said lateral protrusion edges, and adjacent to said shoulder portion, and
  said lateral protrusion surfaces each of which interconnects said outer surface of said first section and a respective one of said lateral protrusion edges; and
said main groove surface of each of said inner grooves of said impeller is substantially configured to be in the shape of a trapezoid, and has
  two lateral groove edges that are angularly spaced apart from each other about the axis,
  a first groove edge that interconnects said lateral groove edges and that is adjacent to said second groove end, and
  a second groove edge that is spaced apart from said first groove edge along the axis, that interconnects said lateral groove edges, and that is adjacent to said first groove end.

3. The rotor assembly as claimed in claim 1, wherein:
said outer surface of said inner rotor is configured to be frustoconical and tapers toward said rotor end surface of said inner rotor; and
said inner surrounding surface of said connecting section of said impeller is configured to be frustoconical and tapers toward said vane section of said impeller.

4. The rotor assembly as claimed in claim 2, wherein:
said outer surface of said inner rotor is configured to be frustoconical and tapers toward said rotor end surface of said inner rotor; and
said inner surrounding surface of said connecting section of said impeller configured to be frustoconical and tapers toward said vane section of said impeller.

5. A canned motor device comprising:
a base formed in a shape of a hollow cylinder that surrounds an axis, and defining an accommodating space;
a fixed seat formed in a shape of a hollow cylinder that surrounds the axis, and disposed in said accommodating space;
a motor unit including
  a case body that is disposed on said base,
  a stator that is sleeved on said case body and that is surrounded by said fixed seat,
  an inner rotor that is disposed in said case body and that has
    a first section having
      a rotor end surface,
      an outer surface that surrounds an axis and that is connected to said rotor end surface,
      a plurality of protrusions that are angularly spaced apart from each other about the axis and that protrude from said outer surface, and
      a plurality of engaging grooves that are angularly spaced apart from each other about the axis and that are indented from said outer surface, a second section located at one side of said outer surface opposite to said rotor end surface and connected to said first section in a direction of the axis, and a shoulder portion interconnecting said first section and said second section, each of said protrusions extending from said rotor end surface to said shoulder portion, and having a first protrusion end and a second protrusion end that are respectively adjacent to said rotor end surface and said shoulder portion, and at least one lateral protrusion surface that extends from said first protrusion end to said second protrusion end, and that is oblique to the axis, said second protrusion end having a width in a circumferential direction of said inner rotor greater than that of said first protrusion end, and an impeller that has a connecting section coupled to said first section of said inner rotor and having a shoulder facing surface that corresponds in position to said shoulder portion of said inner rotor, an inner surrounding surface that surrounds the axis and defines an accommodating hole, an outer surrounding surface that is opposite to said inner surrounding surface, a plurality of inner grooves each of which is indented from said inner surrounding surface, is formed through said shoulder facing surface and has a first groove end that is adjacent to said shoulder facing surface, and a second groove end that is opposite to said first groove end along the axis, said first groove end having a width in a circumferential direction of said impeller greater than that of said second groove end, a plurality of pairs of slots each of which is indented from said shoulder facing surface and is formed through said inner surrounding surface and said outer surrounding surface, and a plurality of engaging hooks each of which is located between a respective one pair of said slots, and a vane section connected to said connecting section in the direction of the axis, each of said inner grooves being defined by a main groove surface, two lateral groove surfaces and a groove end surface, said main groove surface of each of said inner grooves being located radially between said inner surrounding surface and said outer surrounding surface, each of said lateral groove surfaces of each of said inner grooves interconnecting said main groove surface of said inner groove and said inner surrounding surface, and extending from sad first groove end to said second groove end, said groove end surface of each of said inner grooves interconnecting said main groove surface, said lateral groove surfaces and said inner surrounding surface and being located at said second groove end, at least one of said lateral groove surfaces being oblique to the axis;

a first cover disposed on said base and covering said impeller; and a second cover located at one side of said base opposite to said first cover along the axis, and fixedly mounted to said base;

wherein, each of said protrusions of said inner rotor has a largest width in the circumferential direction of said inner rotor greater than a smallest width of a respective one of said inner grooves of said impeller in the circumferential direction of said impeller so that when said engaging hooks of said impeller respectively engage said engaging grooves of said inner rotor, said protrusions of said inner rotor respectively engage said inner grooves of said impeller in a manner that said at least one lateral protrusion surface of each of said protrusions urges one of said lateral groove surfaces of the respective one of said inner grooves.

6. The canned motor device as claimed in claim 5, wherein:

said at least one lateral protrusion surface of each of said protrusions of said inner rotor includes two lateral protrusion surfaces;

each of said protrusions said inner rotor further has a main protrusion surface that is spaced apart from said outer surface, that is substantially configured to be in the shape of a trapezoid, and that has two lateral protrusion edges angularly spaced apart from each other about the axis, a first protrusion edge interconnecting said lateral protrusion edges and adjacent to said rotor end surface of said first section, and a second protrusion edge spaced apart from said first protrusion edge along the axis, interconnecting said lateral protrusion edges, adjacent to said shoulder portion, and said lateral protrusion surfaces each of which interconnects said outer surface of said first section and a respective one of said lateral protrusion edges; and said main groove surface of each of said inner grooves of said impeller is substantially configured to be in the shape of a trapezoid, and has two lateral groove edges that are angularly spaced apart from each other about the axis, a first groove edge that interconnects said lateral groove edges and that is adjacent to said second groove end, and a second groove edge that is spaced apart from said first groove edge along the axis, that interconnects said lateral groove edges, and that is adjacent to said first groove end.

7. The canned motor device as claimed in claim 5, wherein:

said outer surface of said inner rotor is configured to be frustoconical and tapers toward said rotor end surface of said inner rotor; and said inner surrounding surface of said connecting section of said impeller is configured to be frustoconical and tapers toward said vane section of said impeller.

8. The canned motor device as claimed in claim 6, wherein:

said outer surface of said inner rotor is configured to be frustoconical and tapers toward said rotor end surface of said inner rotor; and said inner surrounding surface of said connecting section of said impeller is configured to be frustoconical and tapers toward said vane section of said impeller.

* * * * *